Nov. 6, 1962     O. A. OPPERTHAUSER     3,062,353
WORK TRANSFER MECHANISM
Filed March 9, 1961     7 Sheets-Sheet 1
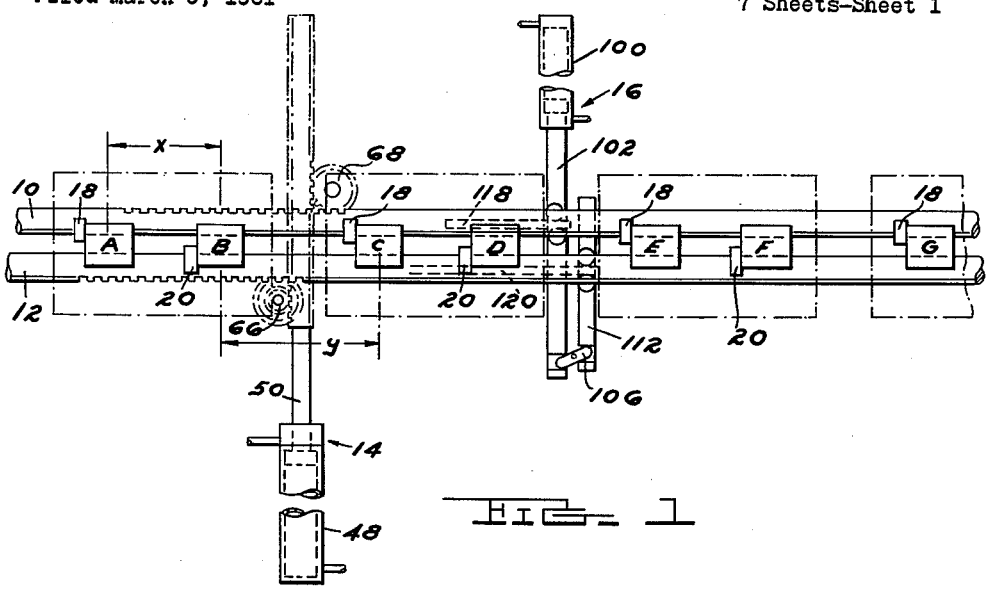
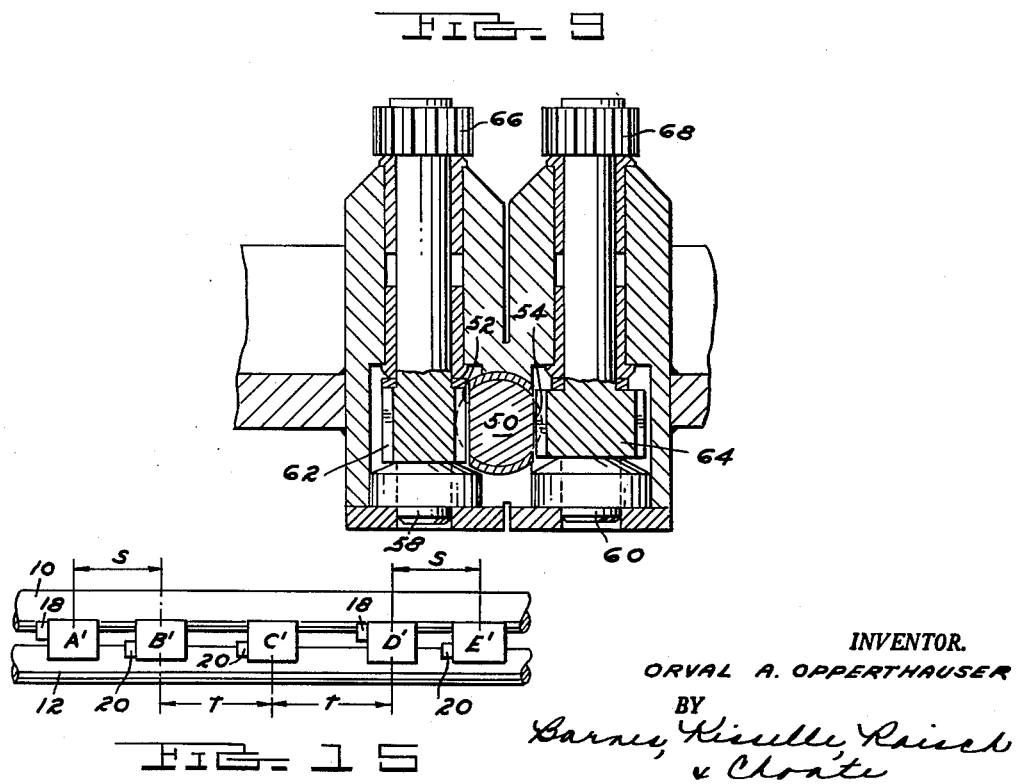
INVENTOR.
ORVAL A. OPPERTHAUSER
BY
ATTORNEYS

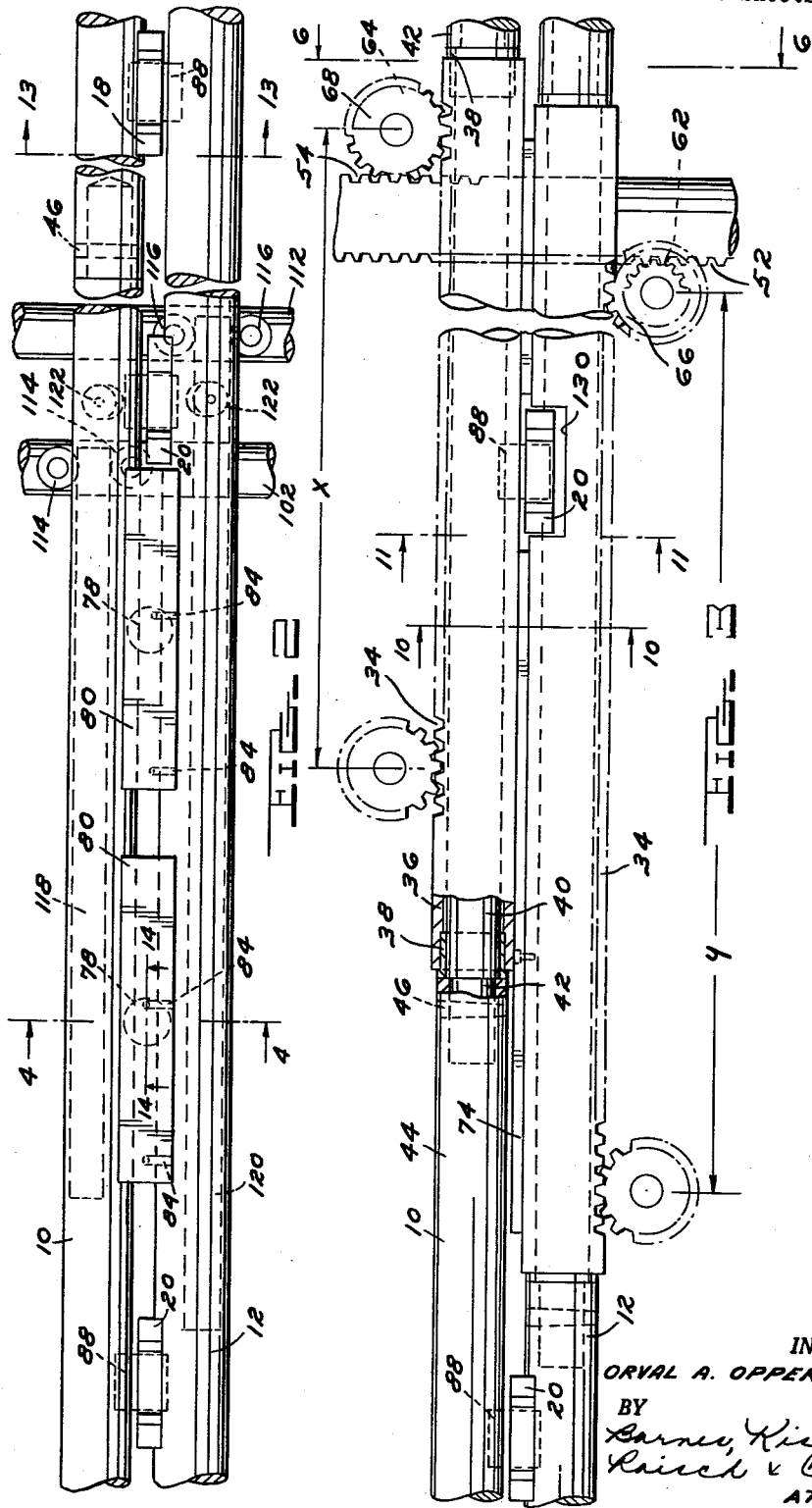

Nov. 6, 1962   O. A. OPPERTHAUSER   3,062,353
WORK TRANSFER MECHANISM
Filed March 9, 1961   7 Sheets-Sheet 3
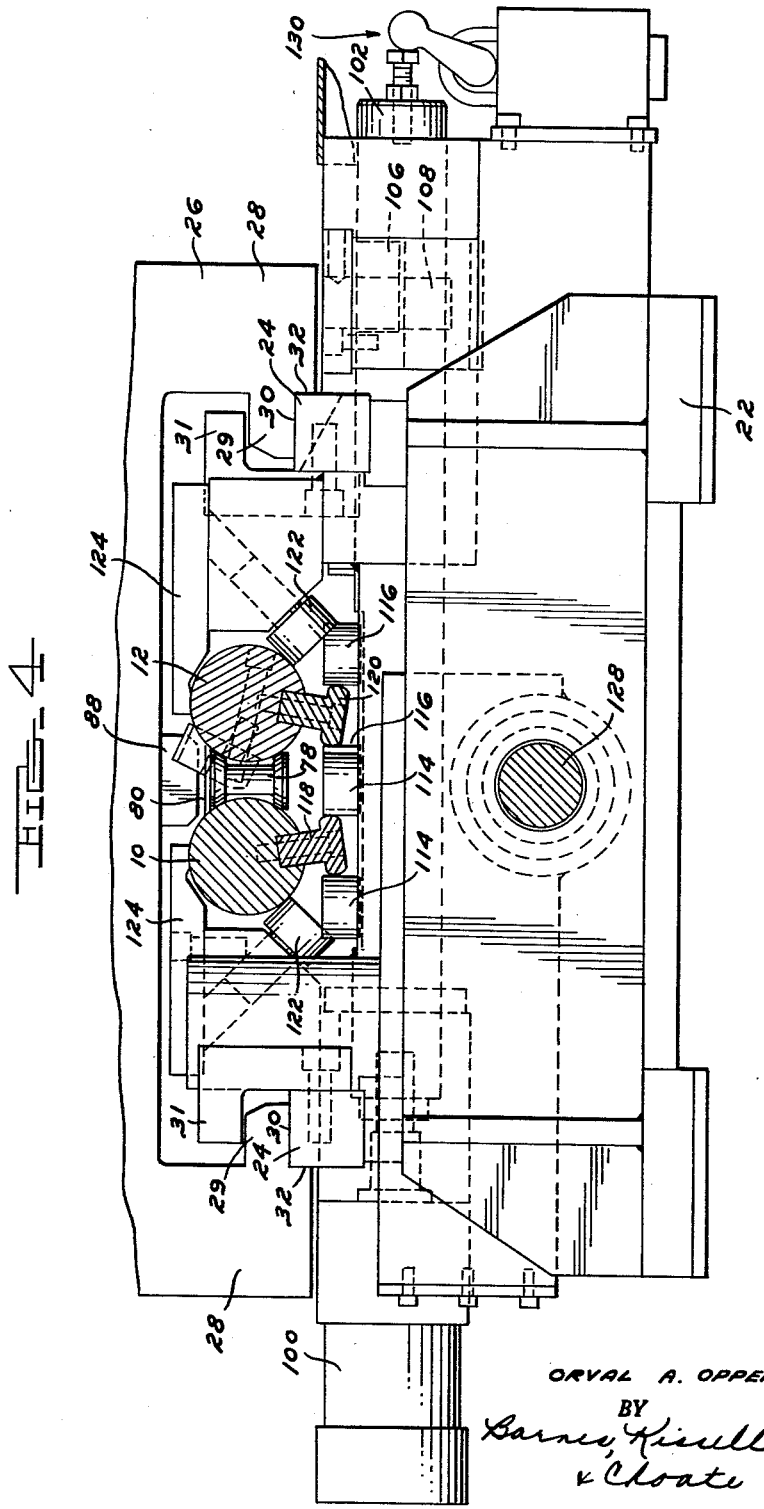
INVENTOR.
ORVAL A. OPPERTHAUSER
BY
Barnes, Kisselle, Raisch
& Choate
ATTORNEYS

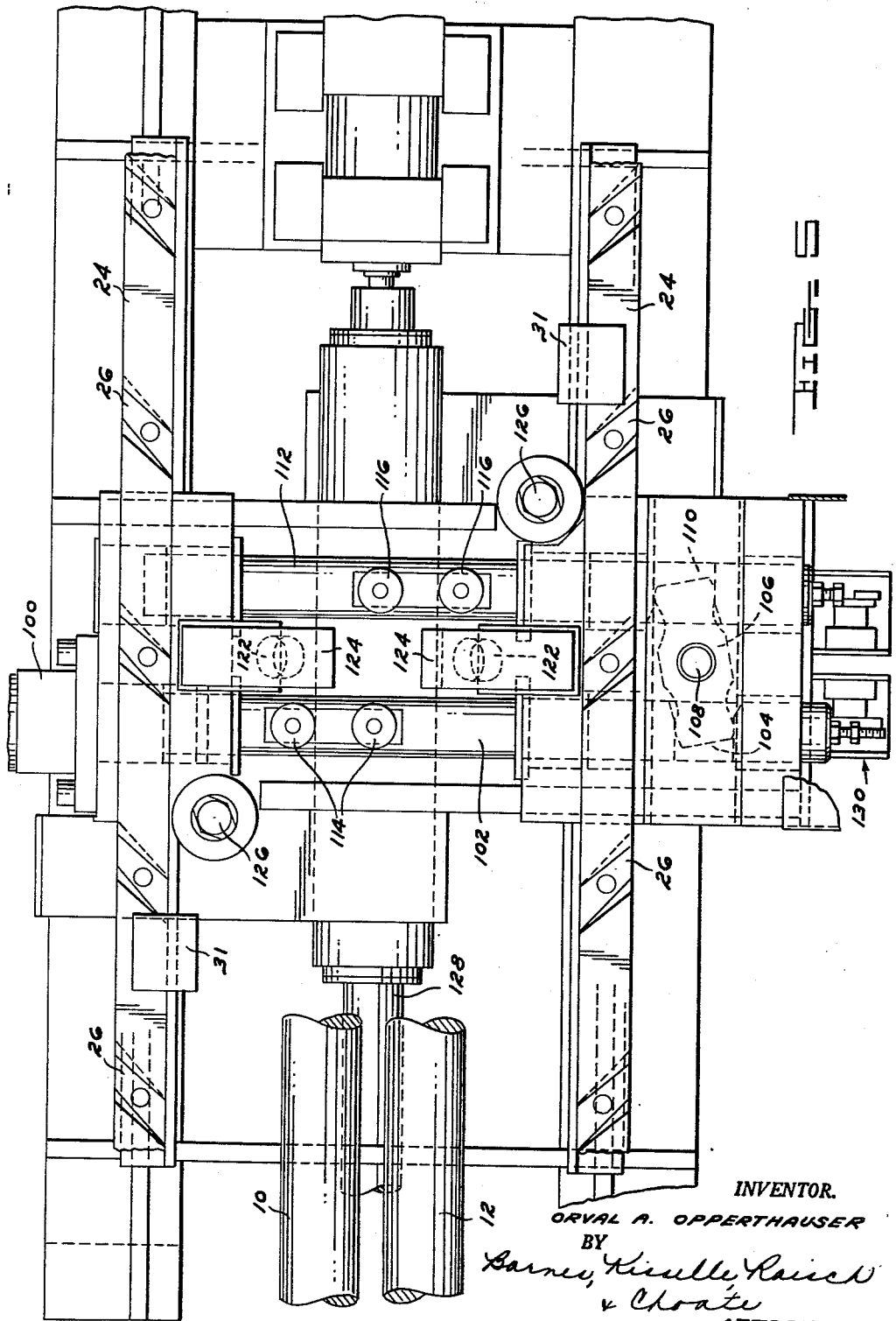

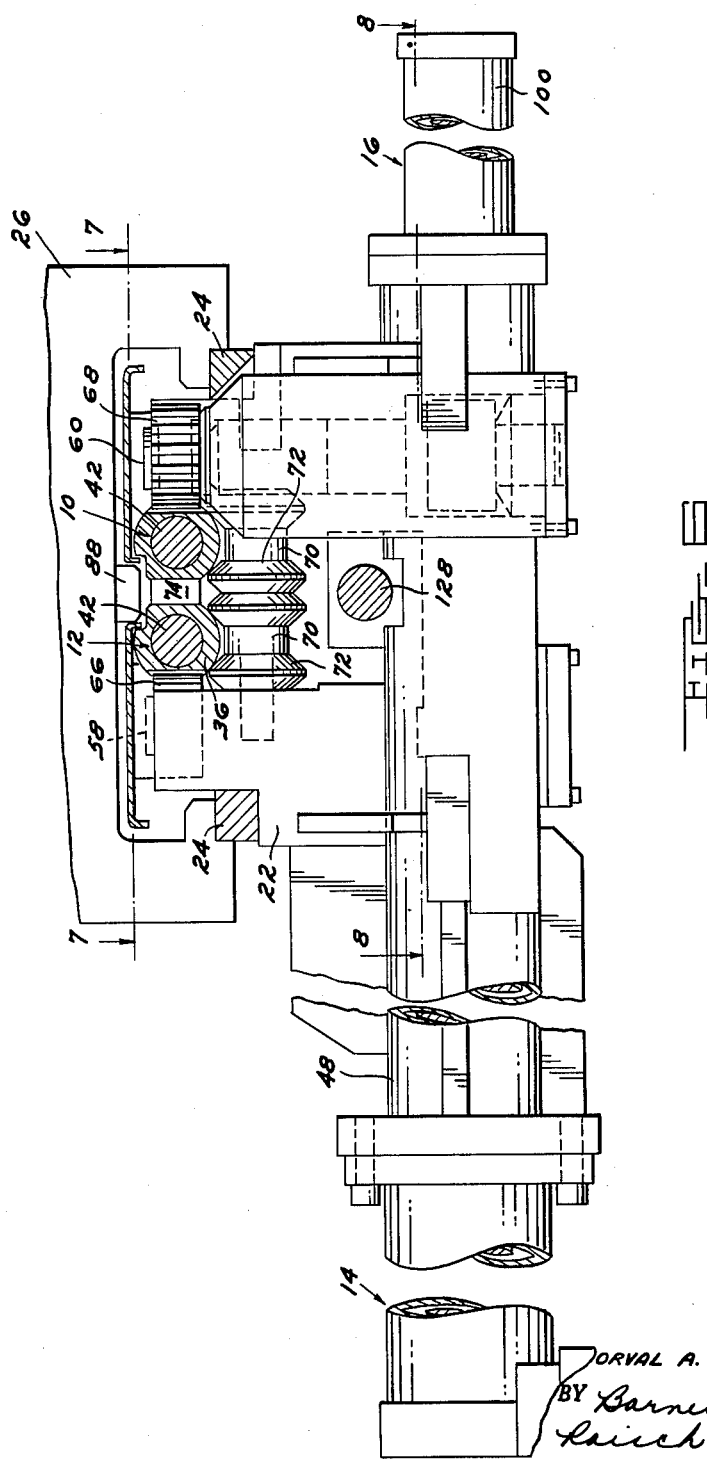

Nov. 6, 1962  O. A. OPPERTHAUSER  3,062,353
WORK TRANSFER MECHANISM
Filed March 9, 1961  7 Sheets-Sheet 6
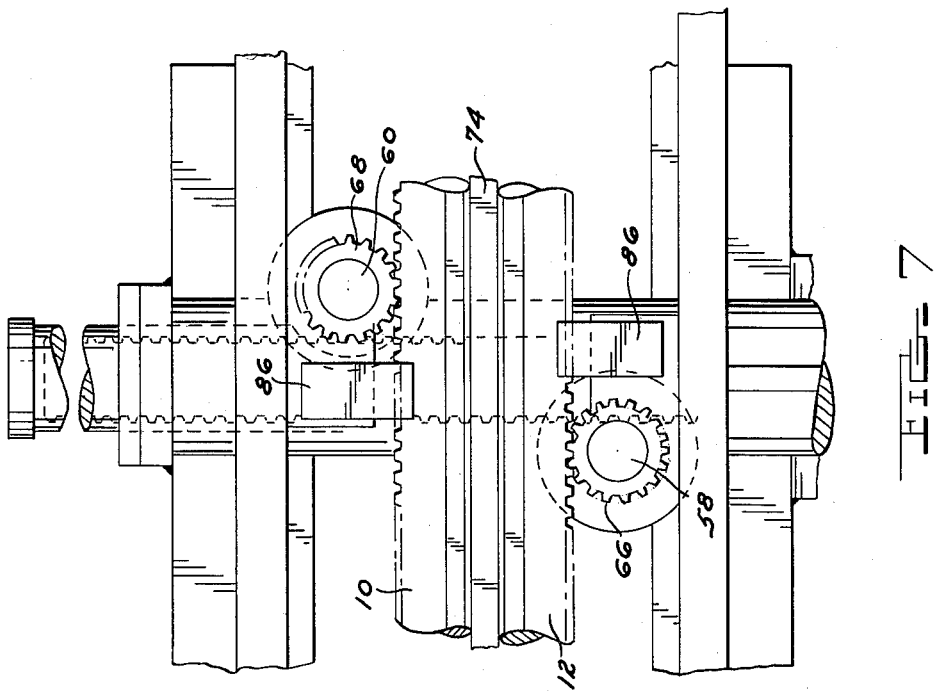
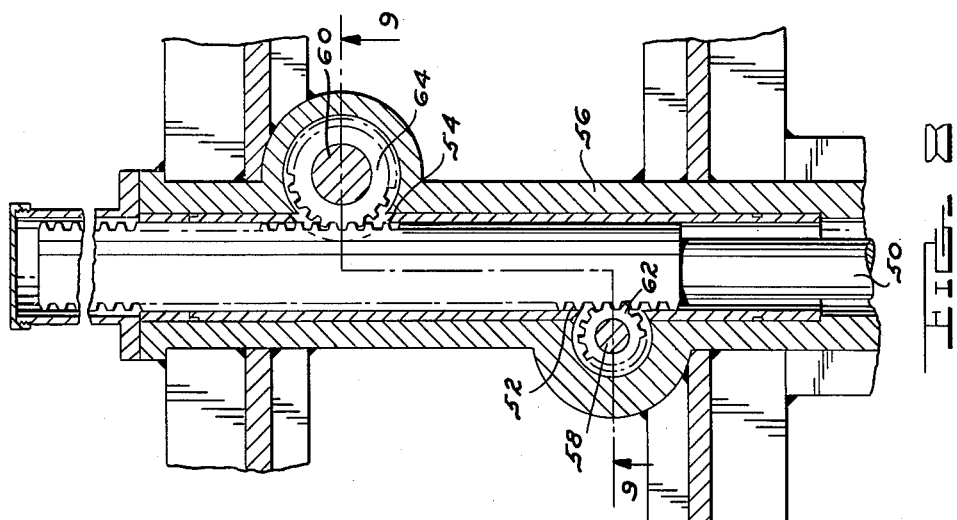
INVENTOR.
ORVAL A. OPPERTHAUSER
BY
Barnes, Kisselle, Raisch & Choate
ATTORNEYS

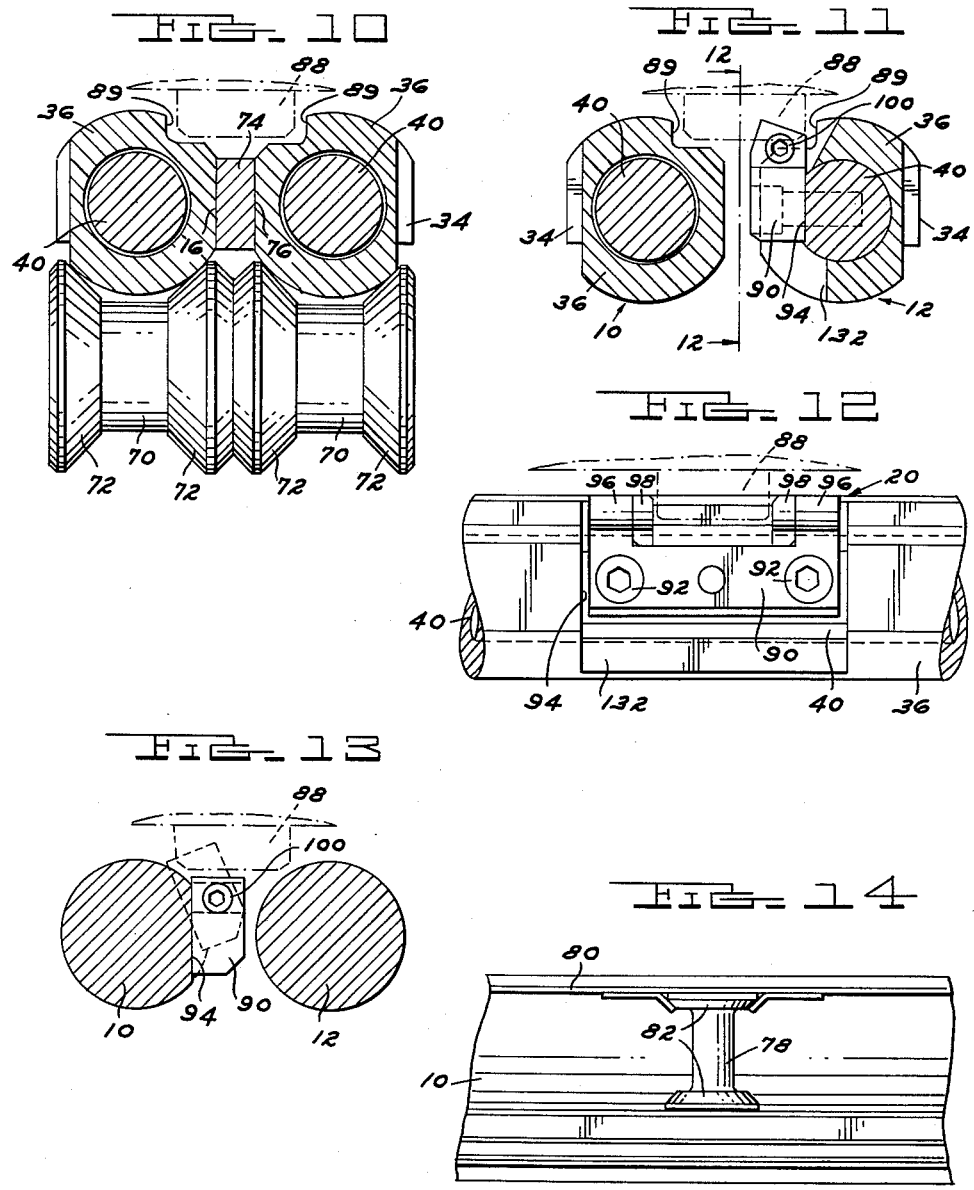

United States Patent Office 3,062,353
Patented Nov. 6, 1962

3,062,353
WORK TRANSFER MECHANISM
Orval A. Opperthauser, Bloomfield Township, Oakland County, Mich., assignor to F. Joseph Lamb Co., Detroit, Mich., a corporation of Michigan
Filed Mar. 9, 1961, Ser. No. 94,560
16 Claims. (Cl. 198—19)

This invention relates to a work transfer mechanism for machine tools.

In automation machining, it is conventional to position a plurality of machine tools in a series path and progressively move pallet supported workpieces on rails progressively to each machine tool so that the machine tools successively perform machining operations on the workpieces. The size of each of these machine tools, the nature of the machining operation and the necessity for access to the machine tool in many instances determine the minimum spacing between successive machine tools and thus the spacing between successive machining stations along the work transfer line. Obviously, to utilize floor space efficiently, it is desirable to space the machine tools apart a distance no greater than necessary. Heretofore, it has been customary to space the successive stations apart in the path of travel of the workpiece at regular intervals because the work transfer mechanism was designed to feed the successive workpieces a fixed uniform distance during each cycle of the transfer mechanism.

It is an object of this invention to provide a work transfer mechanism which is designed to advance the workpieces through different distances at different locations so as to effect a more efficient utilization of floor space, thus, with the work transfer mechanism of the present invention, if two successive machine tools must by necessity be spaced apart a distance greater than required by two other successive machine tools the work transfer mechanism can accommodate for these different spacings.

Another object of the invention is to provide a work transfer mechanism including two transfer bars which are axially reciprocable through different strokes so that one transfer bar can advance work pieces through a stroke of predetermined length and the other transfer bar can advance the work pieces through a stroke of different length.

A further object of the invention is to provide a work transfer mechanism which includes a pair of axially reciprocable transfer bars and a single motive means for reciprocating each bar through a stroke of different length from the other transfer bar.

Another object of the invention resides in the provision of a transfer mechanism having a pair of axially reciprocable transfer bars and a novel means for rotating the transfer bars at the opposite ends of their strokes.

A still further object of the present invention resides in the provision of a work transfer mechanism which includes a pair of axially reciprocable and rotatable transfer bars and a novel arrangement for supporting the transfer bars for rotation and axial reciprocation.

In the drawings:

FIG. 1 is a schematic plan view showing of a portion of the work transfer mechanism of the present invention.

FIG. 2 is a fragmentary top plan view of the work transfer mechanism at the portion thereof which includes the means for rotating the transfer bars about their longitudinal axes.

FIG. 3 is a fragmentary top elevational view of the transfer mechanism at another portion thereof which includes the means for reciprocating the transfer bars axially.

FIG. 4 is a sectional view taken along the line 4—4 in FIG. 2.

FIG. 5 is a fragmentary top elevation view of the transfer mechanism with the transfer bars broken away and showing particularly the transfer bar rotating mechanism.

FIG. 6 is a sectional view taken along the line 6—6 in FIG. 3.

FIG. 7 is a sectional view taken along the line 7—7 in FIG. 6.

FIG. 8 is a sectional view taken along the line 8—8 in FIG. 6.

FIG. 9 is a sectional view taken along the line 9—9 in FIG. 8.

FIG. 10 is a sectional view taken along the line 10—10 in FIG. 3.

FIG. 11 is a sectional view taken along the line 11—11 in FIG. 3.

FIG. 12 is a sectional view taken along the line 12—12 in FIG. 11.

FIG. 13 is a sectional view taken along the line 13—13 in FIG. 2.

FIG. 14 is a sectional view taken along the line 14—14 in FIG. 2.

FIG. 15 is a schematic showing of another arrangement of stations which may be utilized with the transfer mechanism of this invention.

Referring first to FIG. 1 wherein a portion of the work transfer mechanism of this invention is shown schematically, work supporting pallets are illustrated at stations A, B, C, D, E, F and G. The spacing between stations A and B is designated $x$. The spacing between stations B and C is designated $y$. It will be observed that distance $x$ is smaller than the distance $y$. Stations C and D and stations E and F are similarly spaced apart the distance $x$. Likewise stations D and E and stations F and G are spaced apart a distance $y$. The work transfer mechanism includes a pair of transfer bars designated 10 and 12, an actuating mechanism generally designated 14 for reciprocating the transfer bars 10 and 12 axially and a second actuating mechanism generally designated 16 for rotating the transfer bars 10 and 12 about their longitudinal axes. The mechanism 14 is designed to reciprocate transfer bar 10 through the stroke $x$ and the transfer bar 12 through the stroke $y$. As will be observed in FIG. 1, each transfer bar is provided with a plurality of work engaging members. The work engaging members on bar 10 are designated 18 and the work engaging members on bar 12 are designated 20. The work engaging members 18 on bar 10 are spaced apart longitudinally of bar 10 a distance corresponding to the spacing between stations A and C. The spacing between the work engaging members 20 on bar 12 are spaced apart along the bar a distance corresponding to the spacing between stations C and D. Thus, with the two transfer bars in the positions represented in FIG. 1 and with the work engaging members 18, 20 engaging their respective pallets, when the mechanism 14 is energized, transfer bar 10 will advance a pallet from station A to station B, another pallet from station C to station D, another pallet from station E to station F, etc. Simultaneously therewith, transfer bar 12 will advance a pallet from station B to station C, another pallet from station D to station E, another pallet from station F to station G, etc. At each of these stations, there is located a machine tool or other device (not shown) for performing some operation on the workpieces. As will be apparent from the showing in FIG. 1, the machine tools at stations A and B are adapted to be spaced closer together than the machine tools at stations B and C.

Referring now to FIG. 4, the work transfer mechanism of the present invention includes a plurality of support bases 22, one of these support bases may be located at each of the stations in the machine or if desired, a single base may be utilized for supporting the mechanism at successive pairs of stations. In either case, the successive support bases 22 support a pair of transversely spaced continuously extending support rails 24. Each rail 24 is provided along its length with transversely inclined chip clearing grooves 26. Rails 24 are designed to slidably support pallets 26 on which the workpieces (not shown) are securely mounted. Each pallet 26 has a pair of transversely spaced depending legs 28 having pads 29 which are accurately machined at their bottom faces to form horizontally and vertically disposed guide surfaces 30 and 32, respectively which bear against the top and outer side faces of rails 24. Retainers 31 on bases 22 engage over pads 29 at the successive stations.

Referring now to FIGS. 3 and 10, each transfer bar 10, 12 has a portion thereof formed with a gear rack 34. These portions of the transfer bars are formed as sleeves 36 journalled as by bushings 38 on an inner shaft 40. Shaft 40 has reduced extensions 42 which are telescoped into the adjacent ends of the solid portions 44 of the transfer bars. Taper pins 46 interconnect the portions 44 with the extensions 42 so that the sleeves 36 and the solid portions 44 are adapted to reciprocate as a unit while the solid portions 44 and the internal shafts 40 are capable of rotating about their longitudinal axes with respect to sleeves 36.

Referring now to FIGS. 3, 6, 7, 8 and 9, the mechanism for reciprocating the transfer bars 10, 12 through different strokes is there illustrated. This mechanism includes a hydraulic cylinder 48 fixedly mounted on a support base 22 and within which is arranged a piston having rod 50. The outer end of rod 50 is formed with rack portions 52 and 54 on diametrically opposite sides thereof. Rack portions 52, 54 lie in spaced parallel vertical planes. Within the housing 56 in which the piston rod 50 is slidably supported, there is journalled a pair of upright shafts 58, 60. On the lower end of shaft 58, there is fixed a pinion 62 which meshes with gear rack portion 52 and at the lower end of shaft 60 there is fixed a pinion 64 which meshes with gear rack portion 54. A pinion 66 is fixed at the upper end of shaft 58 (FIG. 6) and a similar pinion 68 is fixed to the upper end of shaft 60. Pinion 66 meshes with the rack portion 34 on the sleeve 36 of transfer bar 12 and pinion 68 meshes with the rack portion 34 on sleeve 36 of transfer bar 10. It will be observed that while pinions 66 and 68 are of the same size, pinion 62 at the lower end of shaft 58 has a smaller pitch diameter than pinion 64 at the lower end of shaft 60. Thus, when cylinder 48 is energized to actuate the piston rod 50, transfer bar 10 is actuated through a shorter stroke than transfer bar 12. The relative length of the strokes of transfer bars 10 and 12 are determined by the relative pitch diameters of pinions 62 and 64.

Transfer bars 10 and 12 are supported on their underside by a plurality of rollers 70 as is illustrated in FIGS. 6 and 10. Each roller 70 has inwardly tapered flanges 72 at its opposite ends for engaging the bottom side of each cylindrical transfer bar at radially spaced points. Thus, the rollers 70 support the transfer bars and restrain them in a lateral direction as well. At the portion of each transfer bar provided with the rack 34, the inward thrust of the two pinions 66, 68 is resisted by a thrust bar 74 which is screwed and dowelled to one of the sleeves 36. Sleeves 36 have their inner faces flattened as at 76 so that one of the sleeves is adapted to have the thrust bar 74 mounted thereon and the other sleeve is adapted to slide against the thrust bar as the two transfer bars reciprocate relative to one another.

At other longitudinally spaced points along the transfer bars 10 and 12, the two bars are prevented from bowing inwardly toward one another by means of vertically disposed rollers 78 loosely journalled on plates 80 (FIGS. 2 and 14). Rollers 78 have inclined flanges 80 at their upper and lower ends for engaging circumferentially spaced points on the two transfer bars. One of the transfer bars, the transfer bar 12 as illustrated in FIG. 2, has radially projecting pins 84 thereon which are adapted to limit the rolling movement of rollers 78 in a direction axially of the transfer bars. In addition, as shown in FIGS. 6 and 7, retainer plates 86 are fixedly supported adjacent the pinions 66, 68 so that their inner ends overlie the two transfer bars and thus prevent the transfer bars from being displaced vertically upwardly.

Referring now to FIGS. 4, 6 and 10 through 13, it will be noted that each pallet 26 has a centrally disposed downwardly projecting lug 88 on the underside thereof. The sleeves 36 of the two transfer bars are cut away as at 89 to provide clearance for the lugs 88 on the undersides of the pallets. Lugs 88 are adapted to be engaged by the work engaging members 18 on bar 10 and 20 on bar 12 to advance the pallets along the rails 24. Work engaging members 18 and 20 are similarly constructed. Each includes a body portion 90 mounted as by screws 92 into a recess portion 94 of its respective transfer bar. Each body portion 90 is provided with a pair of upstanding arms 96 which are spaced apart axially of the transfer bar. Lug engaging shoes 98 are retained against the opposed inner faces of arms 96 by screws 100. The space between shoes 98 on each of the work engaging members is slightly greater than the length of the lugs 88 on the pallets.

The work engaging members 18 and 20 are designed to engage and disengage the lugs 88 on the inner side of the pallets by rotating the two transfer bars 10 and 12. The mechanism employed for rotating the transfer bars is shown most clearly in FIGS. 4 and 5. This mechanism includes a hydraulic cylinder 100 mounted on a support base 22 so that its axis extends generally transversely of the transfer bars. The piston rod 102 associated with cylinder 100 extends horizontally below the transfer bars to the opposite side of base 22. Adjacent its free end, piston rod 102 is formed with a transverse slot 104 in which is engaged one end of a rocker arm 106. Rocker arm 106 is pivoted centrally of its ends on an upright pin 108. The opposite end of rocker arm 106 engages within a slot 110 in a rod 112 which is reciprocably mounted for movement in a horizontal path parallel to the path of reciprocation of piston rod 102. With this arrangement when piston rod 102 is shifted transversely of the transfer bars in one direction, the action of rocker arm 106 shifts rod 112 transversely in the opposite direction. A pair of rollers 114 are journalled on upright pins on the top side of rod 102 and a similar pair of rollers 116 are journalled on upright pins on the top side of rod 112. The rollers in each pair are spaced apart in a direction transversely of the transfer bars 10 and 12 so as to engage with T-shaped guide bars 118 and 120 which extend longitudinally of and project downwardly from transfer bars 10 and 12, respectively, at the portion thereof which extend over the transfer bar rotating mechanism. Each guide bar 118, 120 has a length somewhat greater than the stroke of the respective transfer bar so that throughout the stroke of each transfer bar its respective guide bar 118, 120 remains engaged with the associated rollers 114, 116, respectively. Means are provided for energizing cylinder 100 at the opposite ends of the strokes of guide bars 10 and 12. Thus, when the transfer bars 10 and 12 reach the end of their retraction stroke, cylinder 100 is actuated to project piston rod 102 in a direction outwardly of cylinder 100 and rod 112 is correspondingly shifted in a direction toward cylinder 100. Accordingly, as viewed in FIG. 4, transfer bar 10 is rotated about its longitudinal axis in a counterclockwise direction and transfer bar 12 is rotated in a clockwise direction.

The work engaging members 18 and 20 are positioned on the transfer bars 10 and 12, respectively, to correspond with the successive stations along the transfer mechanism. Thus, on transfer bar 10 the work engaging members 18 in retracted position of transfer bar register with the lugs 88 on the pallets located at stations A, C, E, G, etc. and the work engaging members 20 on transfer bar 12 register with the lugs on the underside of the pallets at stations B, D, F, etc. Actuation of cylinder 100 as described at the end of the retraction stroke of the transfer bars thus causes the work engaging members on two transfer bars to rotate upwardly into engagement with the lugs 88 of the pallets located at the successive stations. At the end of the forward stroke of each transfer bar, cylinder 100 is actuated to retract piston rod 102 and thus rotate the work engaging members 18, 20 downwardly out of engagement with the lugs of the pallets.

Since the transfer bars 10 and 12 cannot be supported on the underside, such as by rollers 70 in the vicinity of the transfer bar rotating mechanism because of the guide bars 118 and 120, in this vicinity the transfer bars are supported from below by rollers 122 which are journalled on axes which incline outwardly and upwardly at an angle of about 45 degrees. As is illustrated in FIG. 2, in the vicinity of the transfer bar rotating mechanism, rollers 78 disposed between the two transfer bars serve as spacer elements for resisting lateral bowing. Retainers 124 are likewise arranged directly over rollers 122 (FIGS. 4 and 5) to prevent the transfer bars from riding upwardly when they are rotated.

As was mentioned previously and is apparent from FIG. 12, the spacing between shoes 98 on the work engaging members is slightly greater than the length of the lugs 88 on the undersides of the pallets. Thus, the work engaging members are not utilized for locating the pallets in an accurately predetermined position at each station. The work locating mechanism, which does not form a part of this invention, comprises a plurality of locating pins 126 (FIG. 5) which are arranged at each station of the transfer mechanism. These locating pins have tapered upper ends and are adapted to be projected upwardly into accurately sized sockets in the pallets in response to reciprocation of an axially extending shaft 128. Shaft 128 may also be utilized for actuating clamps for rigidly clamping the pallets on the rails 24 at each station.

In operation, assuming that the two transfer bars 10 and 12 are in the retracted position and there is a pallet 26 at each station of the transfer mechanism, the feed cycle of the mechanism is initiated by automatic actuation of cylinder 100. The mechanism, of course, includes a control system for automatically controlling the cycle of operation and for automatically stopping the transfer mechanism in case of malfunction of any component. For example, the control mechanism includes a switch arrangement generally designated 130 for electrically indicating the two positions of the two transfer bar rotating bars 102 and 112. Likewise, the control system includes a switch mechanism (not shown) for electrically indicating the two positions of the two transfer bars.

As explained previously, when cylinder 100 is actuated at the end of the retraction stroke of the two transfer bars the work engaging members 18 and 20 are rotated upwardly into engagement with the lugs 88 of the pallets located at the successive stations. Thereafter, cylinder 48 is actuated to initiate the forward stroke of the two transfer bars. As pointed out previously, both transfer bars are driven through different strokes by utilizing pinions 62, 64 of different sizes meshing with the racks 52, 54 formed on the end of piston rod 50. Thus, in the illustrated arrangement, since the pinion 62 has a smaller pitch diameter than the pinion 64, transfer bar 10 is shifted forwardly through the stroke $x$ (FIGS. 1 and 3) while transfer bar 12 is driven forwardly through the greater stroke $y$. During the forward stroke of the two transfer bars, the work engaging members 18, 20 are disposed in the upwardly rotated work engaging position and thus each of the pallets engaged by the work engaging members of the two transfer bars are transported forwardly on rails 24 a distance corresponding to the strokes of the two transfer bars. For example, referring to FIG. 1, the work engaging members 18 on transfer bar 10 advance pallets from station A to B, from station C to D and from station E to F. Similarly, the work engaging members 20 on transfer bar 12 advance pallets from station B to station C, from D to station E and from station F to station G. At the end of the forward strokes of transfer bars 10 and 12, cylinder 100 is again automatically actuated to retract piston rod 102 and thus rotate the work engaging members 18 and 20 on the two transfer bars downwardly out of engagement with the lugs 88 on the pallets. In this connection, it will be observed that at the portions of the transfer bars provided with the racks 34, sleeves 36 are slotted through the wall thereof as indicated at 132 (FIGS. 3, 11 and 12) and the work engaging members are mounted directly on the inner shafts 40.

After the work engaging members 18 and 20 are rotated downwardly to the retracted position, cylinder 48 is again automatically actuated to retract piston rod 50 and thereby retract both transfer bars through their respective strokes to a position wherein the work engaging members 18 and 20 again register with lugs 88 on the underside of the pallets at the successive stations.

It will be understood from the foregoing that the arrangement of stations illustrated in FIG. 1 is merely illustrative of the principle of operation of the transfer mechanism of the invention and that the invention is not limited to this particular arrangement of stations. The strokes of the two transfer bars can be varied relative to one another to accommodate a whole variety of situations with respect to the placement of the machine tools along the line. For example, in FIG. 15, there is illustrated another arrangement of successive stations through which pallets can be successively transferred by the transfer mechanism of this invention. In the arrangement illustrated in FIG. 15, stations A' and B' are spaced apart a distance $s$, stations B' and C' are spaced apart a distance $t$, stations C' and D' are likewise spaced apart a distance $t$ and stations D' and E' are spaced apart a distance $s$. In this arrangement, work engaging members 18 and 20 would be arranged on the two transfer bars 10 and 12 such that in the retracted position of the two transfer bars work engaging members 18 on bar 10 would register with pallets at stations A' and D' and work engaging members 20 on transfer bar 12 would register with pallets at stations B', C' and E'. Thus, when the transfer bars are actuated forwardly through their strokes, the pallets at stations A' and D' would be advanced by transfer bar 10 through the distance $s$ to the stations B' and E', respectively, and the pallets at stations B' and C' would advance through the distance $t$ to the stations C' and D', respectively.

Thus, it will be seen that I have provided a transfer mechanism which does not require the successive machine tools along the machining line to be spaced apart uniform distances. The adjacent machine tools can be arranged to effect a more efficient utilization of floor space than is the case where the successive stations, because of the design of the transfer mechanism, must be uniformly spaced apart. The non-uniform spacing of the various stations along the machining line is made possible by utilizing a plurality of transfer bars, as distinguished from one, which transfer bars are actuated through strokes of different lengths from a single motor unit. The present invention also provides a relatively simple mechanism for rotating the transfer bars in unison at the opposite ends of their strokes.

I claim:

1. A work transfer mechanism for progressively moving successively arranged workpieces to a plurality of successive stations spaced apart different distances along a generally rectilinear path comprising work support means extending along said path, a plurality of axially reciprocable work transfer members extending longitudinally of said path and having means spaced longitudinally thereon for engaging workpieces on said support and moving them along said path to said successive stations, means interconnecting said work transfer members such that reciprocation of one of said members through a stroke of predetermined length is effective to reciprocate each of the other transfer members through a stroke of different length in the same direction and a single motor unit for reciprocating said plurality of transfer members.

2. A work transfer mechanism for progressively moving successively arranged workpieces to a plurality of successive stations spaced apart different distances along generally rectilinear path comprising work support means extending along said path, a pair of axially reciprocable transfer members extending longitudinally of said path and having means spaced longitudinally thereon for engaging workpieces on said support and moving them along said path to said successive stations, means operatively interconnecting said work transfer members such that reciprocation of one of said members through a stroke of predetermined length is effective to reciprocate the other member through a stroke of different length in the same direction and a single motor unit reciprocating both of said transfer members.

3. A work transfer mechanism as called for in claim 2 wherein said work transfer members are generally coextensive in length so that said stations are traversed by both of said transfer members.

4. A work transfer mechanism as called for in claim 2 wherein the stroke of one of said transfer members corresponds to the distance between one pair of successive stations and the stroke of the other transfer member corresponds to the spacing between another pair of successive stations, the spacing between the stations in the first pair being different than the spacing between the stations in the second pair.

5. A work transfer mechanism as called for in claim 2 wherein said means interconnecting said work transfer members comprises rack and pinion means.

6. A work transfer mechanism as called for in claim 5 wherein said motor unit comprises a piston cylinder assembly, said rack means comprising a reciprocable shaft on said support extending transversely of said work transfer members, said shaft being operatively connected with said piston cylinder assembly for reciprocation, said pinion means comprising two pinion sets, one pinion in each set being engaged with said shaft and the other pinion in each set being operatively connected with a work transfer member.

7. A work transfer mechanism as called for in claim 5 wherein each of said transfer members comprises an elongated bar, each of said bars having a gear rack at one portion thereof, said motor unit comprising a piston cylinder assembly, said rack means including a shaft reciprocable on said support in a direction transversely of said bars and operatively connected with said cylinder assembly, said pinion means comprising two pinion sets, one pinion in each set being engaged with said shaft and the other pinion in each set being engaged with the rack portions of said bars.

8. A work transfer mechanism as called for in claim 6 wherein the first mentioned pinions of the two sets are of dfferent diameters.

9. A work transfer mechanism for progressively moving successively arranged workpieces to a plurality of successive stations spaced apart along generally rectilinear paths different distances comprising work support means extending along said path, a pair of generally parallel, axially rigid transfer bars extending along said path and reciprocable longitudinally thereof, said bars having lug means thereon for engaging workpieces on said support means and moving the workpieces along said path when the transfer bars have reciprocated, means operatively connecting the transfer bars for reciprocation in unison, said interconnecting means being effective to reciprocate one of said transfer bars through its stroke in response to reciprocation of the other transfer bar through a stroke of different length in the same direction and a single motor unit for reciprocating both of said transfer bars whereby the workpieces engaged by the lugs on one of said transfer bars are advanced through a distance different than the workpieces engaged by the lug means on the other transfer bar when the transfer bars are reciprocated.

10. A work transfer mechanism as called for in claim 9 including means for rotating said transfer bars about longitudinal axes at opposite ends of the strokes of the transfer bars.

11. A work transfer mechanism as called for in claim 10 wherein said lug means are fixedly secured to said transfer bars to rotate and reciprocate therewith.

12. A work transfer mechanism as called for in claim 10 wherein said transfer bar rotating means includes means shiftable in a direction transversely of the longitudinal axes of said transfer bars and longitudinally extending guide means on said transfer bars engaging said transversely shiftable means, the guide means on each bar having a length equal to at least the stroke of the transfer bar on which it is mounted.

13. In a work transfer mechanism the combination comprising a transfer bar having a plurality of work engaging lugs spaced longitudinally thereon, said bar at one portion along its length having a longitudinally extending rib thereon, means shiftable transversely of the longitudinal axis of said bar and engaging said rib for rotating said bar about its longitudinal axis, said bar having at a portion thereof spaced longitudinally from said rib a sleeve in which said bar is rotatable, said sleeve being fixed in a longitudinal position on said bar, said sleeve having a rack portion thereon, and means for reciprocating said transfer bar including a pinion engaging said rack portion.

14. In a work transfer mechanism the combination of a pair of transfer bars arranged in side by side spaced, parallel relation, a pair of sleeves on corresponding portions of said bars, said sleeves being fixed longitudinally on the bars and being rotatable relative thereto, each of said sleeves being formed with a rack portion, said rack portions being disposed diametrically opposite on the outer longitudinal faces of said sleeves, a pinion engaging each said rack portions, and means generally coextensive in length with said rack portions and extending between the inner opposed faces of said sleeves for resisting the lateral thrust resulting from the inner engagement of said pinions with said rack portions.

15. The combination called for in claim 14 including a longitudinally extending rib fixedly mounted on each transfer bar at a location spaced longitudinally from said sleeves and means shiftable in a direction transversely of said transfer bars and engaging said longitudinally extending ribs for rotating said transfer bars about their longitudinal axes.

16. The combination called for in claim 15 wherein said longitudinally extending ribs project downwardly from the bottom side of said transfer bars, and means for supporting said transfer bars adjacent said ribs comprising roller means engaging said bars at lower surface portions thereof spaced laterally outwardly from said longitudinally extending ribs, and second roller means disposed between and engaging the inner opposed surfaces of said transfer bars.

References Cited in the file of this patent

UNITED STATES PATENTS

| | | |
|---|---|---|
| 185,922 | Haudaille | Jan. 2, 1877 |
| 956,890 | Daniels | May 3, 1910 |
| 2,808,746 | Blomquist | Oct. 8, 1957 |

UNITED STATES PATENT OFFICE

CERTIFICATE OF CORRECTION

Patent No. 3,062,353                   November 6, 1962

Orval A. Opperthauser

It is hereby certified that error appears in the above numbered patent requiring correction and that the said Letters Patent should read as corrected below.

Column 7, line 74, after "bars" insert -- are --.

Signed and sealed this 28th day of May 1963.

(SEAL)
Attest:

ERNEST W. SWIDER                  DAVID L. LADD
Attesting Officer                 Commissioner of Patents